United States Patent
Roller et al.

(10) Patent No.: US 9,096,753 B2
(45) Date of Patent: Aug. 4, 2015

(54) AQUEOUS BINDER COMPOSITION COMPRISING OLIGOMERS

(75) Inventors: Sebastian Roller, Mannheim (DE); Rolf Dersch, Neustadt (DE); Felix Baah, XP Almere (NL)

(73) Assignee: BASF SE, Ludwigshafen (DE)

( * ) Notice: Subject to any disclaimer, the term of this patent is extended or adjusted under 35 U.S.C. 154(b) by 873 days.

(21) Appl. No.: 13/132,197

(22) PCT Filed: Nov. 23, 2009

(86) PCT No.: PCT/EP2009/065624
§ 371 (c)(1),
(2), (4) Date: Jun. 1, 2011

(87) PCT Pub. No.: WO2010/063599
PCT Pub. Date: Jun. 10, 2010

(65) Prior Publication Data
US 2011/0237736 A1    Sep. 29, 2011

(30) Foreign Application Priority Data

Dec. 1, 2008  (EP) .................................. 08170342

(51) Int. Cl.
*C10G 50/00* (2006.01)
*C08L 33/00* (2006.01)
*B01F 3/12* (2006.01)
*C09D 133/00* (2006.01)

(52) U.S. Cl.
CPC .............. *C08L 33/00* (2013.01); *C09D 133/00* (2013.01); *C08L 2205/02* (2013.01)

(58) Field of Classification Search
CPC . C08L 2666/04; C08L 33/00; C08L 2205/02; C09D 133/00
USPC ....................................................... 524/516
See application file for complete search history.

(56) References Cited

U.S. PATENT DOCUMENTS

| | | | |
|---|---|---|---|
| 3,551,387 A * | 12/1970 | Landau .......................... | 528/292 |
| 4,226,007 A | 10/1980 | Duenser | |
| 4,269,749 A | 5/1981 | Marriott et al. | |
| 4,414,370 A | 11/1983 | Hamielec et al. | |
| 4,529,787 A | 7/1985 | Schmidt et al. | |
| 4,546,160 A | 10/1985 | Brand et al. | |
| 4,733,005 A | 3/1988 | Schmidt et al. | |
| 6,011,107 A * | 1/2000 | Maxwell et al. ............... | 524/566 |
| 6,492,451 B1 * | 12/2002 | Dersch et al. .................. | 524/430 |
| 7,026,373 B2 * | 4/2006 | Smith et al. .................... | 522/182 |
| 2003/0191236 A1 * | 10/2003 | Buckmann et al. ............ | 524/591 |

FOREIGN PATENT DOCUMENTS

| | | |
|---|---|---|
| DE | 2 061 213 | 6/1971 |
| DE | 2 207 209 | 10/1972 |
| DE | 27 22 097 | 11/1978 |
| EP | 0 040 419 | 11/1981 |
| EP | 0 525 977 | 2/1993 |
| EP | 0 567 812 | 11/1993 |
| EP | 0 614 922 | 9/1994 |
| EP | 0 693 540 | 1/1996 |
| EP | 1 686 160 | 8/2006 |
| GB | WO 03/082999 | * 10/2003 |
| JP | 2007 145990 | 6/2007 |
| WO | 93 25588 | 12/1993 |
| WO | 99 10414 | 3/1999 |
| WO | WO 99/25780 A1 | 5/1999 |
| WO | 02 100961 | 12/2002 |
| WO | WO 02/100961 | * 12/2002 |
| WO | 03 082999 | 10/2003 |
| WO | 2005 121595 | 12/2005 |
| WO | WO 2006/079453 A1 | 8/2006 |
| WO | 2006 118974 | 11/2006 |

OTHER PUBLICATIONS

Joncryl; BASF, The Chemical Company; Jan. 1, 2007.*
Polyment, Nippon Shokubai; Polyment, NK-350; p. 3/4; Apr. 2005.*
International Preliminary Report on Patentability and Written Opinion issued Jun. 7, 2011 in PCT/EP2009/065624.
International Search Report Issued Feb. 8, 2010 in PCT/EP09/065624 filed Nov. 23, 2009.

* cited by examiner

*Primary Examiner* — Liam J Heincer
*Assistant Examiner* — Marilou Lacap
(74) *Attorney, Agent, or Firm* — Oblon, McClelland, Maier & Neustadt, L.L.P.

(57) ABSTRACT

The present invention relates to an aqueous binder composition comprising:
 at least one polymer P having a glass transition temperature $T_g$ in the range from −20 to +60° C., in the form of an aqueous polymer dispersion PD which is obtainable by free-radical emulsion polymerization of at least one ethylenically unsaturated monomer M, and
 0.1 to 10% by weight, based on the sum of polymer P and oligomer, of one or more oligomers which are composed of ethylenically unsaturated monomers and have an average molecular weight $M_w$ of 1000 to 30 000 g/mol, a glass transition temperature $T_g$ in the range from +60 to +120° C., and an acid number in the range from 50 to 350,
to a process for preparing it, to coating materials comprising it, and also to the use of water-soluble oligomers in a mixture with aqueous polymer dispersions in coating materials that lead to coatings featuring increased gloss.

20 Claims, No Drawings

AQUEOUS BINDER COMPOSITION COMPRISING OLIGOMERS

The present invention relates to an aqueous binder composition comprising an aqueous polymer dispersion and oligomers having an acid number in the range from 50 to 350, and also to coating materials which comprise such a binder composition. The invention further relates to the use of water-soluble oligomers in a mixture with aqueous polymer dispersions in coating materials that lead to coatings featuring increased gloss, and to a method of producing coatings featuring increased gloss.

In accordance with their capacity to reflect light, coatings are typically divided into four categories (DIN EN 13300):
1 "gloss", with a reflectometer value of ≥60 at a measuring angle of 60°,
2. "medium gloss", with a reflectometer value of <60 at a measuring angle of 60° and ≥10 at 85°,
3. "flat", with a reflectometer value of <10 at a measuring angle of 85°; and
4. "very flat", with a reflectometer value of <5 at a measuring angle of 85°.

The quality of unpigmented, and especially of pigmented, coating materials based on aqueous polymer dispersions is critically dependent on the gloss of the coatings obtained. There has therefore been no lack of attempts to improve said gloss by means of suitable additions. Often, however, these additions have the disadvantage of also exhibiting a certain volatility, which impacts adversely on the fraction of volatile organic compounds (VOC) in the coatings obtained from such materials.

EP 693 540 teaches an aerosol coating material based on an alcoholic/aqueous solution of a thermoplastic polyacrylate and able to comprise water-soluble acrylate copolymers having molecular weights in the range from 800 to 10 000 g/mol and a glass transition temperature of around 45° C. Essential for aerosol coating is that the polymer is soluble, since otherwise there are problems during spraying. The admixed acrylate copolymers are used in a weight ratio, relative to the polyacrylate, of 40/60 to 60/40. When such high quantities of water-soluble acrylate copolymers are added, an increase in the gloss is observed.

EP 525 977 describes an aqueous traffic marking paint comprising a binder polymer composed of a polyacrylate and an auxiliary polymer. The auxiliary polymer is an oligomer of styrenes and unsubstituted or substituted acrylic acid. The polyacrylate is prepared in an emulsion polymerization in the presence of the auxiliary polymer, which functions as a protective colloid. According to that specification, the preparation of an emulsifier-free binder polymer of that kind necessitates 25% by weight of auxiliary polymer, based on the overall solids content of the binder.

WO 2006/079453 teaches water-based high-gloss varnishes comprising noncrosslinkable oligomers having a molecular weight of 5000 to 15 000 daltons and a glass transition temperature in the range from 0 to 50° C., and a polymer dispersion having an average molecular weight of more than 53 000 daltons and a glass transition temperature in the range from 10 to 40° C.

WO 03/082999 describes a water-based paint formulation comprising a mixture of a noncrosslinkable, low molecular weight oligomer having a glass transition temperature in the range from −50 to 20° C. and a high molecular weight polymer. The effect of using the noncrosslinkable oligomers of low molecular mass is an extended open time on the part of the paint formulation.

WO 2006/118974 describes the preparation of aqueous binders by multistage emulsion polymerization for use in coating compositions. There, in a first step, polymers with an acid number <60 are formed and are subsequently neutralized. In the presence of these polymers a second emulsion polymerization step is carried out.

JP 2007145990 describes dispersions and their films with good water resistance and high gloss. The polymerization takes place in the presence of 20% by weight of an alkali-soluble copolymer as protective colloid.

WO 2005121595 describes a multistage polymer dispersion for the preparation of UV-curable binders for coating compositions. For these purposes, in a first step, acrylate- or methacrylate-based oligomers are prepared and subjected to partial neutralization, before, in the presence of these oligomers, further monomers are reacted, followed ultimately by crosslinking with a bifunctional component. The oligomer of the first stage is used in approximately the same amount as the polymer of the second stage, or in excess.

It was an object of the present invention to provide aqueous binder compositions for use in coating materials featuring increased gloss. The compositions ought especially to be useful for increasing the gloss of gloss paints based on acrylate dispersions.

Surprisingly it has been found that this object is achieved by means of aqueous binder compositions comprising:
  at least one polymer P having a glass transition temperature $T_g$ in the range from −20 to +60° C., in the form of an aqueous polymer dispersion PD which is obtainable by free-radical emulsion polymerization of at least one ethylenically unsaturated monomer M, and
  0.1 to 10% by weight, based on the sum of polymer P and oligomer, of one or more oligomers which are composed of ethylenically unsaturated monomers and have an average molecular weight $M_w$ of 1000 to 30 000 g/mol, a glass transition temperature $T_g$ in the range from +60 to +120° C., and an acid number in the range from 50 to 350.

The invention further provides a method of producing the above binder composition by mixing the above-defined aqueous polymer dispersion PD with one or more of the above-defined oligomers.

The invention further provides a coating material in the form of an aqueous composition comprising:
  10% to 60% by weight of at least one polymer P having a glass transition temperature $T_g$ in the range from −20 to +60° C., which is obtainable by free-radical emulsion polymerization of at least one ethylenically unsaturated monomer M, and
  0.1 to 10% by weight, based on the sum of polymer P and oligomer, of one or more oligomers which are composed of ethylenically unsaturated monomers and have an average molecular weight $M_w$ of 1000 to 30 000 g/mol, a glass transition temperature $T_g$ in the range from +60 to +120° C., and an acid number in the range from 50 to 350,
  up to 70% by weight of inorganic fillers and/or inorganic pigments,
  0.1% to 20% by weight of typical auxiliaries, and
  water to 100% by weight.

The invention further provides for the use of a composition comprising the above-defined aqueous polymer dispersion PD and one or more of the above-defined oligomers as a component in clear varnishes and in high-gloss paints.

The invention further provides, in addition, a method of producing coatings featuring increased gloss, wherein an aqueous coating material comprising 10% to 60% by weight of at least one polymer P having a glass transition temperature $T_g$ in the range from −20 to +60° C., which is obtainable by free-radical emulsion polymerization of at least one ethylenically unsaturated monomer M, and 0.1 to 10% by weight, based on the sum of polymer P and oligomer, of one or more oligomers which are composed of ethylenically unsaturated monomers and have an average molecular weight $M_w$ of 1000 to 30 000 g/mol, a glass transition temperature $T_g$ in the range from +60 to +120° C., and an acid number in the range from 50 to 350, up to 70% by weight of inorganic fillers and/or inorganic pigments, 0.1% to 20% by weight of typical auxiliaries, and water to 100% by weight.

is applied to a substrate.

The invention further provides for the use of oligomers composed of one or more ethylenically unsaturated monomers and having an average molecular weight $M_w$ of 1000 to 30 000 g/mol, a glass transition temperature $T_g$ in the range from +60 to +120° C., and an acid number in the range from 50 to 350, in a mixture with the above-defined polymer dispersion PD, to increase the gloss of the coatings produced therefrom.

The glass transition temperature $T_g$ here is the midpoint temperature as determined in accordance with ASTM D 3418-82 by differential thermal analysis (DSC) (cf. Ullmann's Encyclopedia of Industrial Chemistry, 5th edition, volume A 21, VCH Weinheim 1992, p. 169 and also Zosel, Farbe and Lack 82 (1976), pp. 125-134; see also DIN 53765).

The acid number (AN) is an index for characterizing the fraction of free organic acid radicals. The acid number is the index indicating how many milligrams of potassium hydroxide (KOH) are needed in order to neutralize $T_g$ of the sample under determination (hereinafter, of the oligomer (solids)). The determination is made in accordance with (DIN EN ISO 2114).

In accordance with the invention the binder composition comprises at least one polymer P as defined above, or a mixture of two or more polymers P as defined above.

The Oligomers

In accordance with the invention the aqueous binder composition, besides the polymer dispersion PD, comprises at least 0.1% to 10% by weight of one or more oligomers which are composed of ethylenically unsaturated monomers based on the sum of polymer P (solids) and oligomer, and which have an average molecular weight $M_w$ of 1000 to 30 000 g/mol, a glass transition temperature $T_g$ in the range from +60 to +120° C., and an acid number in the range from 50 to 350 mg KOH/g.

The oligomers having an average molecular weight $M_w$ of 1000 to 30 000 g/mol as determined by gel permeation chromatography (GPC) are noncrosslinked. Preference is given to oligomers having an average molecular weight of 1500 to 20 000, in particular 2000 to 15 000 g/mol.

From this it is evident that, with an acid number of 50 to 350, they are soluble in ammoniacal water. Water-soluble means in this context that at least 10 g of oligomer dissolve in one liter of deionized water at a pH>7 and a temperature of 25° C. The oligomers preferably have good water solubility, in the sense that 20% strength by weight solutions dissolve in 4% strength aqueous ammonia.

The oligomers that are suitable in accordance with the invention are obtained by free-radical polymerization of one or more monoethylenically unsaturated monomers having a water solubility <30 g/l at 25° C. and 1 bar, and one or more ethylenically unsaturated carboxylic acids, and, if appropriate, up to 10% by weight, based on the overall monomers in copolymerized form, of other monomers.

Suitable monoethylenically unsaturated monomers having a water solubility <30 g/l are the monomer classes (a)—esters of α,β-ethylenically unsaturated monocarboxylic acids and dicarboxylic acids with $C_1$-$C_{20}$alkanols—and (b)—vinylaromatics—set out below under "Polymer dispersion PD".

Suitable ethylenically unsaturated carboxylic acids are the carboxylic acids listed below in monomer class (f).

As other monomers it is possible to use monomers other than the two above groups, examples being the monomer class (h): esters of α,β-ethylenically unsaturated monocarboxylic and dicarboxylic acids with $C_2$-$C_{30}$ alkanediols.

The oligomers used in accordance with the invention can be prepared preferably by bulk polymerization.

The oligomers are preferably obtained by bulk polymerization of (i) at least one water-soluble monomer selected from acrylic acid, methacrylic acid, fumaric acid, maleic anhydride, and itaconic acid, especially acrylic acid and methacrylic acid, and (ii) at least one monomer selected from alkyl esters of acrylic acid, alkyl esters of methacrylic acid, acrylamides and derivatives thereof, styrene, α-methylstyrene, methyl methacrylate, butyl acrylate, and 2-ethylhexyl acrylate.

Oligomers and processes of preparing them by bulk polymerization are described in detail in U.S. Pat. No. 4,414,370, U.S. Pat. No. 4,529,787, and U.S. Pat. No. 4,546,160, the disclosure content of which is hereby expressly incorporated by reference. As a general rule, the polymerization takes place in a continuously operated stirred tank. Typically this is accomplished in a temperature range from 180 to 270° C. The residence time of the monomer mixture in the reaction zone is generally from 1 minute to 60 minutes, in particular from 1 to 20 minutes. The polymerization is generally initiated thermally by the decomposition of a free-radical initiator, the initiator/monomer ratio being preferably 0.005/1 to 0.015/1.

A further possibility is to add to the monomer mixture 0% to 25% by weight of a solvent, preferably of a high-boiling solvent. High boiling means boiling temperatures of ≥150° C. under atmospheric pressure. Preferred solvents are diethylene glycol monoethyl ether, dipropylene glycol methyl ether, and high-boiling aromatics.

The oligomers prepared by bulk polymerization are distinguished by a narrow molecular weight distribution. The ratio $M_w/M_n$ is preferably <5, more preferably <4, in particular in the range from 1.5 to 3. It has been found that oligomers having a narrow molecular weight distribution are beneficial for the gloss of the coatings produced therewith.

The oligomers obtained by this process have glass transition temperatures in the range from +60 to 120° C.

In general the oligomers are used as resins. It is also possible, though, to use them in a mixture with fine polystyrene particles. By fine are meant particle sizes of 5 to 200 nm, preferably 10 to 100 nm, more particularly 15 to 75 nm. Polystyrene dispersions with particle sizes of this kind are obtainable, for example, by emulsion polymerization of styrene in the presence of these oligomers. The fraction of oligomer, based on the sum of polystyrene and oligomer, can be up to 10% to 80%, preferably 20% to 70%, more preferably 25% to 65%, by weight.

In accordance with this further embodiment according to the invention, the aqueous binder composition comprises at least one above-defined polymer P, 0.1 to 10% by weight, based on the sum of polymer P and oligomer, of one or more oligomers which are composed of ethylenically unsaturated monomers and have an average molecular weight $M_w$ of 1000 to 30 000 g/mol, a glass transition temperature $T_g$ in the range from +60 to +120° C., and an acid number in the range from 50 to 350, and 0.01% to 15% by weight, preferably 0.02% to 10% by weight, of polystyrene, based on the overall binder (solids).

Additionally it is possible to add the oligomers in a mixture with acrylate-based polymer dispersions which comprise the oligomer in a fraction of 10% to 40% by weight. Polymer dispersions of this kind are available, for example, from BASF SE under the name Joncryl®.

Polymer Dispersion PD

The polymer P has a glass transition temperature $T_g$ in the range from −20 to +60° C. The polymer dispersion PD is obtained by free-radical emulsion polymerization of at least one ethylenically unsaturated monomer M.

Generally speaking, polymer P is a copolymer obtained by copolymerizing two or more monomers M. The skilled worker is able in this case, through a skilful choice of monomer composition, to prepare polymers having a glass transition temperature in the range from −20 to +60° C.

According to Fox (see Ullmanns Enzyklopädie der technischen Chemie, 4th edition, volume 19, Weinheim (1980), pp. 17, 18), it is possible to estimate the glass transition temperature $T_g$. The glass transition temperature of copolymers with little or no crosslinking is given at high molar mass in good approximation by:

$$\frac{1}{Tg} = \frac{X^1}{Tg^1} + \frac{X^2}{Tg^2} + \ldots \frac{X^n}{Tg^n}$$

where $X^1, X^2, \ldots, X^n$ are the mass fractions $1, 2, \ldots, n$ and $T_g^1, T_g^2, T_g^n$ are the glass transition temperatures of the polymers synthesized in each case only from one of the monomers $1, 2, \ldots, n$, in degrees Kelvin. The latter are known, for example, from Ullmann's Encyclopedia of Industrial Chemistry, VCH, 5th ed., Weinheim, vol. A 21 (1992) p. 169 or from J. Brandrup, E. H. Immergut, Polymer Handbook $3^{rd}$ ed., J. Wiley, New York 1989.

In general the monomers M are selected from esters of α,β-ethylenically unsaturated monocarboxylic and dicarboxylic acids with $C_1$-$C_{20}$ alkanols and $C_5$-$C_{10}$ cycloalkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$-amino alcohols containing a primary or secondary amino group, primary amides of α,β-ethylenically unsaturated monocarboxylic acids and their N-alkyl and N,N-dialkyl derivatives, N-vinyl lactams, open-chain N-vinylamide compounds, esters of allyl alcohol with $C_1$-$C_{30}$ monocarboxylic acids, esters of α,β-ethylenically unsaturated monocarboxylic and dicarboxylic acids of amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$ monoolefins, nonaromatic hydrocarbons having at least two conjugated double bonds, polyether (meth)acrylates, monomers containing urea groups, and mixtures thereof.

Where (meth)acrylates are referred to in the context of this application, what are meant are not only the corresponding acrylates, in other words the derivatives of acrylic acid, but also the methacrylates, the derivatives of methacrylic acid.

Examples of suitable monomers include the following:

(a): Esters of α,β-ethylenically unsaturated monocarboxylic and dicarboxylic acids with $C_1$-$C_{20}$ alkanols, especially the esters of acrylic acid, methacrylic acid, and ethacrylic acid, such as methyl(meth)acrylate, methyl ethacrylate, ethyl (meth)acrylate, ethyl ethacrylate, n-propyl(meth)acrylate, isopropyl(meth)acrylate, n-butyl(meth)acrylate, sec-butyl (meth)acrylate, tert-butyl(meth)acrylate, tert-butyl ethacrylate, n-hexyl(meth)acrylate, n-heptyl(meth)acrylate, n-octyl(meth)acrylate, 1,1,3,3-tetramethylbutyl (meth)acrylate, ethylhexyl(meth)acrylate, n-nonyl(meth) acrylate, n-decyl(meth)acrylate, n-undecyl(meth)acrylate, tridecyl(meth)acrylate, myristyl(meth)acrylate, pentadecyl(meth)acrylate, palmityl(meth)acrylate, heptadecyl (meth)acrylate, nonadecyl(meth)acrylate, arachinyl(meth) acrylate, behenyl(meth)acrylate, lignoceryl(meth) acrylate, cerotinyl(meth)acrylate, melissyl(meth)acrylate, palmitoleyl(meth)acrylate, oleyl(meth)acrylate, linolyl (meth)acrylate, linolenyl(meth)acrylate, stearyl(meth) acrylate and lauryl(meth)acrylate.

(b): Vinylaromatics, preferably styrene, 2-methylstyrene, 4-methylstyrene, 2-(n-butyl)styrene, 4-(n-butyl)styrene, 4-(n-decyl)styrene, and α-methylstyrene, and more preferably styrene and α-methylstyrene.

(c): Esters of vinyl alcohol with $C_1$-$C_{30}$ monocarboxylic acids, such as vinyl formate, vinyl acetate, vinyl propionate, vinyl butyrate, vinyl laurate, vinyl stearate, vinyl propionate and vinyl esters of Versatic acid.

(d): Ethylenically unsaturated nitriles such as acrylonitrile and methacrylonitrile.

(e): Vinyl halides and vinylidene halides such as vinyl chloride, vinylidene chloride, vinyl fluoride, and vinylidene fluoride.

(f): Ethylenically unsaturated carboxylic acids and sulfonic acids or their derivatives are acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids, having 4 to 10, preferably 4 to 6, C atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivatives thereof are styrene-4-sulfonic acid and styrene-3-sulfonic acid and the alkaline earth metal or alkali metal salts thereof, e.g. sodium styrene-3-sulfonate and sodium styrene-4-sulfonate. Particularly preferred are acrylic acid and methacrylic acid.

(g): Phosphorus monomers such as vinylphosphonic acid and allylphosphonic acid. Further suitable are the monoesters and diesters of phosphonic acid and phosphoric acid with hydroxyalkyl(meth)acrylates, especially the monoesters. Suitable additionally are diesters of phosphonic acid and phosphoric acid which have been esterified singly with a hydroxyalkyl(meth)acrylate and also singly with a different alcohol, an alkanol, for example. Suitable hydroxyalkyl (meth)acrylates for these esters are those specified as separate monomers below, more particularly 2-hydroxyethyl (meth)acrylate, 3-hydroxypropyl(meth)acrylate, 4-hydroxybutyl(meth)acrylate, etc. Corresponding dihydrogen phosphate ester monomers comprise phosphoalkyl (meth)acrylates, such as 2-phosphoethyl(meth)acrylate, 2-phosphopropyl(meth)acrylate, 3-phosphopropyl(meth)acrylate, phosphobutyl(meth)acrylate, and 3-phospho-2-hydroxypropyl(meth)acrylate. Also suitable are the esters of phosphonic acid and phosphoric acid with alkoxylated hydroxyalkyl(meth)acrylates, examples being the ethylene oxide condensates of (meth)acrylates such as $H_2C=C(CH_3)COO(CH_2CH_2O)_nP(OH)_2$ and $H_2C=C(CH_3)COO(CH_2CH_2O)_nP(=O)(OH)_2$, in which n is 1 to 50. Additionally suitable are phosphoalkyl crotonates, phosphoalkyl maleates, phosphoalkyl fumarates, phosphodialkyl(meth)acrylates, phosphodialkyl crotonates, and allyl phosphates. Further suitable monomers containing phosphorus groups are described in WO 99/25780 and U.S. Pat. No. 4,733,005, hereby incorporated by reference.

(h): Esters of α,β-ethylenically unsaturated monocarboxylic and dicarboxylic acids, with $C_2$-$C_{30}$ alkanediols such as 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexylmethacrylate, 3-hydroxy-2-ethylhexyl acrylate, and 3-hydroxy-2-ethylhexyl methacrylate.

(i): Primary amides of α,β-ethylenically unsaturated monocarboxylic acids such as acrylamide and methacrylamide.

(k): N-Alkylamides and N,N-dialkylamides of α,β-ethylenically unsaturated monocarboxylic acids such as N-methyl(meth)acrylamide, N-ethyl(meth)acrylamide, N-propyl(meth)acrylamide, N-(n-butyl)(meth)acrylamide, N-(tert-butyl)(meth)acrylamide, N-(n-octyl)(meth)acrylamide, N-(1,1,3,3-tetramethylbutyl)(meth)acrylamide, N-ethylhexyl(meth)acrylamide, N-(n-nonyl)(meth)acrylamide, N-(n-decyl)(meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth)acrylamide, N-arachinyl(meth)acrylamide, N-behenyl(meth)acrylamide, N-lignoceryl(meth)acrylamide, N-cerotinyl(meth)acrylamide, N-melissinyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth)acrylamide, N,N-dimethyl(meth)acrylamide, N,N-diethyl(meth)acrylamide, and morpholinyl(meth)acrylamide.

(o): Esters of α,β-ethylenically unsaturated monocarboxylic and dicarboxylic acids with amino alcohols such as N,N-dimethylaminomethyl(meth)acrylate, N,N-dimethylaminoethyl(meth)acrylate, N,N-diethylaminoethyl acrylate, N,N-dimethylaminopropyl(meth)acrylate, N,N-diethylaminopropyl(meth)acrylate, and N,N-dimethylaminocyclohexyl(meth)acrylate.

(p): Amides of α,β-ethylenically unsaturated monocarboxylic and dicarboxylic acids with diamines which contain at least one primary or secondary amino group, such as N-[2-(dimethylamino)ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino)butyl]methacrylamide, N-[2-(diethylamino)ethyl]acrylamide, N-[4-(dimethylamino)cyclohexyl]acrylamide, and N-[4-(dimethylamino)cyclohexyl]methacrylamide.

(s): $C_2$-$C_8$ monoolefins and nonaromatic hydrocarbons having at least two conjugated double bonds, such as ethylene, propylene, isobutylene, isoprene, and butadiene.

(t): Polyether (meth)acrylates are compounds of the general formula (A)

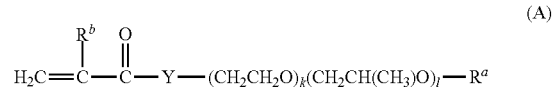

(A)

in which
the sequence of the alkylene oxide units is arbitrary,
k and l independently of one another are an integer from 0 to 100, the sum of k and l being at least 3,
$R^a$ is hydrogen, $C_1$-$C_{30}$alkyl, $C_5$-$C_8$ cycloalkyl or $C_6$-$C_{14}$ aryl,
$R^b$ is hydrogen or $C_1$-$C_8$ alkyl,
Y is O or $NR^c$, $R^c$ being hydrogen, $C_1$-$C_{30}$-alkyl or $C_5$-$C_8$ cycloalkyl.

Polyether (meth)acrylates are, for example, the polycondensation products of the aforementioned α,β-ethylenically unsaturated monocarboxylic and/or dicarboxylic acids and their acid chlorides, amides, and anhydrides with polyetherols. Suitable polyetherols can easily be prepared by reacting ethylene oxide, 1,2-propylene oxide and/or epichlorohydrin with a starter molecule, such as water or a short-chain alcohol $R^a$—OH. The alkylene oxides can be used individually, in alternating succession or as a mixture. The polyether acrylates can be used alone or in mixtures for preparing the emulsion polymers used in accordance with the invention. Suitable polyether (meth)acrylates are available commercially, in the form for example of various products under the name Bisomer® from Laporte Performance Chemicals, UK. These include, for example, Bisomer® MPEG 350 MA, a methoxypolyethylene glycol monomethacrylate.

Preferred compounds of the formula (A) are those in which Y is O, in other words an ether bridge.

Preferred compounds of the formula (A) are those in which k is an integer from 3 to 50, more particularly 4 to 25. Likewise preferred are compounds of the formula (A) in which l is an integer from 3 to 50, more particularly 4 to 25. Particularly preferred compounds are those in which Y is O, $R^b$ is hydrogen or methyl, l is 0 (zero), and k is an integer from 3 to 15, preferably 4 to 12. Particular preference is additionally given to compounds in which Y is O, $R^b$ is hydrogen or methyl, k is 0 (zero), and l is an integer from 3 to 15, preferably 4 to 12.

Preferably $R^a$ in the formula (A) is hydrogen, methyl, ethyl, n-propyl, isopropyl, n-butyl, sec-butyl, n-pentyl, n-hexyl, octyl, 2-ethylhexyl, decyl, lauryl, palmityl or stearyl.

Preferably $R^b$ in the formula (A) is hydrogen, methyl, ethyl, n-propyl, isopropyl, n-butyl, sec-butyl, tert-butyl, n-pentyl or n-hexyl, more particularly hydrogen, methyl or ethyl. With particular preference $R^b$ is hydrogen or methyl.

(u): Suitable monomers containing urea groups, such as N-vinyl or N-allylurea or derivatives of imidazolidin-2-one. These include N-vinyl- and N-allylimidazolidin-2-one, N-vinyloxyethylimidazolidin-2-one, N-(2-(meth)acrylamidoethyl)-imidazolidin-2-one, N-(2-(meth)acryloyloxy-ethyl)imidazolidin-2-one (=2-ureido(meth)acrylate, (UMA), and N-[2-((meth)acryloyloxy)acetamido)ethyl] imidazolidin-2-one. Preferred monomers containing urea groups are N-(2-acryloyloxyethyl)imidazolidin-2-one and N-(2-methacryloyloxyethyl)imidazolidin-2-one. Particular preference is given to N-(2-methacryloyloxyethyl)imidazolidin-2-one (2-ureidomethacrylate, UMA).

The aforementioned monomers M can be used individually, in the form of mixtures within one class of monomer, or in the form of mixtures from different classes of monomer, provided the polymer P has a glass transition temperature $T_g$ in the range from −20 to +60° C., preferably −10 to +50° C., more particularly 0 to 30° C.

The monomers M generally comprise at least 80%, preferably at least 85%, more preferably at least 90%, by weight, of a monoethylenically unsaturated monomer M1 (principal monomer) having a water solubility <30 g/l at 25° C. and 1 bar. These include, in particular, the monomers of classes (a), (b), (c) and (s). Preferred as principal monomers M1 are monomers of classes (a) and (b).

For the emulsion polymerization it is preferred to use at least 80%, more preferably at least 85%, and in particular at least 90%, by weight, based on the overall weight of the monomers M, of at least one monomer M1, which is preferably selected from esters of α,β-ethylenically unsaturated monocarboxylic and dicarboxylic acids with $C_1$-$C_{20}$ alkanols and vinylaromatics. The monomers M1 are used preferably in an amount of up to 99.9%, more preferably up to 99.5%, and in particular up to 99%, by weight, based on the overall weight of the monomers M, for the emulsion polymerization.

The principal monomers M1 are preferably selected from methyl(meth)acrylate, ethyl(meth)acrylate, n-propyl(meth)acrylate, isopropyl(meth)acrylate, n-butyl(meth)acrylate, sec-butyl(meth)acrylate, tert-butyl(meth)acrylate, n-pentyl (meth)acrylate, n-hexyl(meth)acrylate, n-heptyl(meth)acrylate, n-octyl(meth)acrylate, 2-ethylhexyl(meth)acrylate, styrene, 2-methylstyrene, and mixtures thereof.

In addition to at least one principal monomer M1, the free-radical emulsion polymerization for preparing PD can be carried out using at least one further monomer M2, which has a water solubility ≥30 g/l, especially ≥50 g/l, at 25° C. and 1 bar. These monomers M2 are generally present in minor proportions (secondary monomers).

Preferred monomers M2 are monomers of classes (f), (g), (h), and (i).

For the emulsion polymerization it is preferred to use up to 20%, more preferably up to 15%, in particular up to 10%, by weight, based on the overall weight of the monomers M, of at least one monomer M2, which is preferably selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl(meth)acrylates, $C_1$-$C_{10}$ hydroxyalkyl(meth)acrylamides, and mixtures thereof. The monomers M2, where present, are used preferably in an amount of at least 0.1%, more preferably at least 0.5%, in particular at least 1%, by weight, based on the overall weight of the monomers M, for the emulsion polymerization.

The monomers M2 are selected with particular preference from acrylic acid, methacrylic acid, itaconic acid, maleic acid, fumaric acid, maleic anhydride, acrylamide, methacrylamide, 2-hydroxyethyl acrylate, 2-hydroxyethyl methacrylate, 2-hydroxyethylacrylamide, 2-hydroxyethylmethacrylamide, and mixtures thereof.

Particularly suitable combinations of principal monomers M1 for the process of the invention are, for example:
n-butyl acrylate and methyl methacrylate;
n-butyl acrylate, methyl methacrylate, and styrene;
n-butyl acrylate and styrene;
n-butyl acrylate and ethylhexyl acrylate;
n-butyl acrylate, ethylhexyl acrylate, and styrene.

The aforementioned particularly suitable combinations of principal monomers M1 can be combined with particularly suitable monomers M2, which are preferably selected from acrylic acid, methacrylic acid, acrylamide, methacrylamide, and mixtures thereof.

In one specific embodiment the free-radical emulsion polymerization for the preparation of PD is carried out using, in addition to M1 and, if present, M2, at least one polyether (meth)acrylate. The latter is used preferably in an amount of 0.5% up to 15%, preferably 1% to 10%, and more particularly 1% to 5%, by weight, based on the overall weight of the monomers M. Suitable polyether methacrylates are the abovementioned compounds of polymer class (t). Preferably the polyether (meth)acrylate is selected from compounds of the general formula (A) in which Y is O, $R^b$ is hydrogen or methyl, l is 0 (zero), and k is an integer from 3 to 15, preferably 4 to 12, and also from compounds of the general formula (A) in which Y is O, $R^b$ is hydrogen or methyl, k is 0 (zero) and l is an integer from 3 to 15, preferably 4 to 12.

Particular preference is given to a polymer dispersion PD obtained by free-radical emulsion polymerization of monomers comprising
  at least one monomer M1,
  0.1% to 20%, preferably 0.5% to 15%, more particularly 1% to 10%, by weight, based on the overall weight of the monomers M, of at least one monomer M2, which is preferably selected from ethylenically unsaturated monocarboxylic and dicarboxylic acids and the anhydrides and monoesters of ethylenically unsaturated dicarboxylic acids, (meth)acrylamides, hydroxyalkyl (meth)acrylates, $C_1$-$C_{10}$ hydroxyalkyl(meth)acrylamides, and mixtures thereof, and
  0.5% to 15%, preferably 1% to 10%, and more particularly 1% to 5%, by weight, based on the overall weight of the monomers M, of at least one polyether(meth)acrylate.

In a further specific embodiment the free-radical emulsion polymerization for the preparation of PD is carried out using, in addition to the monomers M1, M2 if appropriate, and the polyether (meth)acrylate if appropriate, at least one monomer containing urea groups. The latter is used preferably in an amount of 0.5% to 15%, preferably 1% to 10%, and more particularly 1% to 5%, by weight, based on the overall weight of the monomers M. Preferred monomers containing urea groups are those mentioned above in class (u), especially those specified as preferred therein.

Particular preference is given to a polymer dispersion PD obtained by free-radical emulsion polymerization of monomers comprising
  at least one monomer M1,
  0.1% to 20%, preferably 0.5% to 15%, more particularly 1% to 10%, by weight, based on the overall weight of the monomers M, of at least one monomer M2, preferably selected from ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl(meth) acrylates, hydroxyalkyl(meth)acrylamides, and mixtures thereof, and
  0.5% to 15%, preferably 1% to 10%, and more particularly 1% to 5%, by weight, based on the overall weight of the monomers M, of at least one monomer containing urea groups, preferably selected from those specified in class (u).

In a further specific embodiment the free-radical emulsion polymerization for the preparation of PD is carried out using acetoacetoxyethyl methacrylate in addition to the monomers M1, M2 if appropriate, the polyether (meth)acrylate if appropriate, and the monomer containing urea groups, if appropriate. It is used preferably in an amount of 0.5% to 15%, more preferably 1% to 10%, and more particularly 1% to 5%, by weight, based on the overall weight of the monomers M.

In the preparation of the polymer dispersions of the invention it is possible, in addition to the aforementioned monomers M, to use at least one crosslinker. Monomers which possess a crosslinking function are compounds having at least two polymerizable, ethylenically unsaturated, nonconjugated double bonds in the molecule. Crosslinking may also take place, for example, through photochemical activation. For that purpose, for preparation of PD, it is possible additionally to use at least one monomer having photoactivatable groups. Photoinitiators can also be added separately. Crosslinking may also take place, for example, through functional groups which are able to enter into a chemical crosslinking reaction with functional groups that are complementary to them. These complementary groups may both be attached to the emulsion polymer, and crosslinking effected using a crosslinker capable of entering into a chemical crosslinking reaction with functional groups of the emulsion polymer.

Examples of suitable crosslinkers include acrylic esters, methacrylic esters, allyl ethers or vinyl ethers of at least dihydric alcohols. The OH groups of the parent alcohols may be wholly or partly etherified or esterified; however, the crosslinkers comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis (hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000 g/mol. Apart from the homopolymers of ethylene oxide or propylene oxide it is also possible to use block copolymers of ethylene oxide or propylene oxide, or copolymers comprising ethylene oxide groups and propylene oxide groups incorporated. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. Of course it is also possible for the polyhydric alcohols to be used after reaction with ethylene oxide or propylene oxide, as the corresponding ethoxylates or propoxylates, respectively. The polyhydric alcohols may also first be converted to the corresponding glycidyl ethers by reaction with epichlorohydrin.

Further suitable crosslinkers are the vinyl esters or the esters of monohydric unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative possibility is to esterify the monohydric unsaturated alcohols with polybasic carboxylic acids, examples being malonic acid, tartaric acid, trimellitic acid, phthalic acid, terephthalic acid, citric acid or succinic acid.

Further suitable crosslinkers are esters of unsaturated carboxylic acids with the above-described polyhydric alcohols, examples being those of oleic acid, crotonic acid, cinnamic acid or 10-undecenoic acid.

Further suitable as crosslinkers are straight-chain or branched, linear or cyclic, aliphatic or aromatic hydrocarbons which possess at least two double bonds, which in the case of aliphatic hydrocarbons must not be conjugated, for example, divinylbenzene, divinyltoluene, 1,7-octadiene, 1,9-decadiene, 4-vinyl-1-cyclohexene, trivinylcyclohexane or polybutadienes having molecular weights of 200 to 20 000 g/mol.

Suitability as crosslinkers is possessed, furthermore, by the acrylamides, methacrylamides, and N-allylamines of at least difunctional amines. Examples of such amines are 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides of allylamine and unsaturated carboxylic acids, such as acrylic acid, methacrylic acid, itaconic acid, maleic acid, or at least dibasic carboxylic acids, of the kind described above.

Further suitable as crosslinkers are triallylamine and triallylmonoalkylammonium salts, such as triallylmethylammonium chloride or triallylmethylammonium methyl sulfate, for example.

Also suitable are N-vinyl compounds of urea derivatives, at least difunctional amides, cyanurates or urethanes, such as of urea, ethyleneurea, propyleneurea or tartaramide, e.g., N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used.

The crosslinking monomers also, moreover, include those which as well as an ethylenically unsaturated double bond contain a reactive functional group, an aldehyde, keto or oxirane group, for example, which are able to react with an added crosslinker. The functional groups are preferably keto groups or aldehyde groups. The keto or aldehyde groups are preferably attached to the polymer through copolymerization of copolymerizable, ethylenically unsaturated compounds containing keto groups or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups, or one aldehyde group and one keto group, in the alkyl radical, said alkyl radical comprising preferably a total of 3 to 10 carbon atoms, examples being (meth)acryloyloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl(meth) acrylate, acetoacetoxyethyl(meth)acrylate, and, in particular, diacetoneacrylamide. The crosslinkers preferably comprise a compound having at least two functional groups, more particularly two to five functional groups, which are able to enter into a crosslinking reaction with the functional groups of the polymer, especially the keto groups or aldehyde groups. For this purpose, for example, hydrazide, hydroxylamine or oxime ether or amino groups are included as functional groups for the crosslinking of the keto or aldehyde groups. Suitable compounds with hydrazide groups are, for example, polycarboxylic hydrazides having a molar weight of up to 500 g/mol. Particularly preferred hydrazide compounds are dicarboxylic dihydrazides having preferably 2 to 10 C atoms. These include, for example, oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

Surface crosslinking can additionally be generated by means, as well, of appropriate additization of the aqueous polymer dispersion PD). This includes, for example, addition of a photoinitiator or siccatives. Suitable photoinitiators are those which are excited by sunlight, such as benzophenone or derivatives of benzophenone, for example. Suitable siccatives are the metal compounds recommended for aqueous alkyd resins, based for example on Co or Mn (overview in U. Poth, Polyester and Alkydharze, Vincentz Network 2005, p. 183 f).

The crosslinking component is used preferably in an amount of 0.0005% to 5%, more preferably 0.001% to 2.5%, more particularly 0.01% to 1.5%, by weight, based on the overall weight of the monomers used for the polymerization (including the crosslinker).

Polymer dispersions PD comprising no crosslinker in copolymerized form constitute one special embodiment.

The free-radical polymerization of the monomer mixture M may take place in the presence of at least one regulator. Regulators are used preferably in an amount of 0.0005% to 5%, more preferably of 0.001% to 2.5%, and more particularly of 0.01% to 1.5% by weight, based on the overall weight of the monomers used for the polymerization.

The term "regulators" (polymerization regulators) is applied generally to compounds having high transfer constants. Regulators accelerate chain transfer reactions and so bring about a reduction in the degree of polymerization of the resulting polymers without influencing the overall reaction rate. Among the regulators a distinction may be made between monofunctional, difunctional, and polyfunctional regulators, according to the number of functional groups in the molecule that are able to lead to one or more chain transfer reactions. Suitable regulators are, for example, described comprehensively by K. C. Berger and G. Brandrup in J. Brandrup, E. H. Immergut, Polymer Handbook, 3rd edn., John Wiley & Sons, New York, 1989, pp. II/81-II/141.

Examples of suitable regulators include aldehydes such as formaldehyde, acetaldehyde, propionaldehyde, n-butyraldehyde, and isobutyraldehyde.

As regulators it is also possible, furthermore, to use the following: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ethers.

As regulators it is preferred to use compounds which comprise sulfur in bonded form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-t-butyl trisulfide, dimethyl sulfoxide, dialkyl sulfide, dialkyl disulfide and/or diaryl sulfide.

Additionally suitable as polymerization regulators are thiols (compounds which maintain sulfur in the form of SH groups, also referred to as mercaptans). Preferred regulators are mono-, di-, and polyfunctional mercaptans, mercapto alcohols and/or mercaptocarboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecyl mercaptan.

Examples of difunctional regulators which comprise two sulfur atoms in bonded form are difunctional thiols such as dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates, and butanediol bisthioglycolate, for example. Examples of polyfunctional regulators are compounds which comprise more than two sulfur atoms in bonded form. Examples thereof are trifunctional and/or tetrafunctional mercaptans.

All of the stated regulators may be used individually or in combination with one another. One specific embodiment relates to polymer dispersions PD which are prepared by free-radical emulsion polymerization without addition of a regulator.

For the preparation of the polymers, the monomers can be polymerized with the aid of initiators which form free radicals.

As initiators for the free-radical polymerization it is possible to use the peroxo compounds and/or azo compounds that are typical for these purposes, examples being alkali metal or ammonium peroxodisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxydicarbamate, bis(o-toluoyl)peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis(2-amidinopropane) dihydrochloride or 2,2'-azobis(2-methylbutyronitrile). Mixtures of these initiators, too, are suitable.

Further initiators which can be used are reduction/oxidation (=redox) initiator systems. The redox initiator systems are composed of at least one, usually inorganic, reducing agent and one organic or inorganic oxidizing agent. The oxidation component is, for example, one of the emulsion polymerization initiators already specified above. The reduction component comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to occur in a plurality of valence states. Examples of typical redox initiator systems include ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reduction component for example, may also be mixtures: an example is a mixture of the sodium salt of hydroxymethanesulfinic acid and sodium disulfite.

The amount of the initiators is generally 0.1% to 10%, preferably 0.1% to 5%, by weight, based on all of the monomers to be polymerized. It is also possible for two or more different initiators to be used in the emulsion polymerization.

The polymer dispersion PD is prepared typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers include anionic, cationic, and nonionic emulsifiers. As surface-active substances it is preferred to use emulsifiers, whose relative molecular weights are typically below those of protective colloids.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$), and polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208. Likewise suitable as anionic emulsifiers are bis(phenylsulfonic acid) ethers and their alkali metal or ammonium salts, carrying a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyl-triethylammonium chloride, or quaternary compounds of N—$C_6$-$C_{20}$ alkylpyridines, -morpholines or -imidazoles, e.g. N-laurylpyridinium chloride.

The amount of emulsifier is generally about 0.01% to 10% by weight, preferably 0.1% to 5% by weight, based on the amount of monomers to be polymerized.

It is further possible to add typical auxiliaries and additives to the polymer dispersions PD. These include, for example, pH modifiers, reducing agents, and bleaches, such as the alkali metal salts of hydroxymethanesulfinic acid (e.g., Rongalit® C from BASF Aktiengesellschaft), complexing agents, deodorants, flavors, odorants, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

The polymerization takes place in general at temperatures in a range from 0 to 150° C., preferably 20 to 100° C., more preferably 30 to 95° C. The polymerization takes place preferably at atmospheric pressure, although polymerization at an elevated pressure is also possible, an example being the autogenous pressure of the components used for the polymerization. In one suitable embodiment the polymerization takes place in the presence of at least one inert gas, such as nitrogen or argon, for example.

The polymerization medium may be composed only of water or else of mixtures of water and water-miscible liquids such as methanol. It is preferred to use just water. The emulsion polymerization may be conducted either as a batch operation or else in the form of a feed process, including staged or gradient procedures. Preference is given to the feed process in which a portion of the polymerization batch, or else a polymer seed, is introduced as an initial charge, heated to the polymerization temperature, and its polymerization commenced, after which the remainder of the polymerization batch, typically by way of two or more spatially separate feeds, of which one or more comprise the monomers in pure form or in emulsified form, is supplied to the polymerization zone continuously, in stages or under a concentration gradient, during which the polymerization is maintained.

The manner in which the initiator is added to the polymerization vessel in the course of the free-radical aqueous emulsion polymerization is known to a person of ordinary skill in the art. It may either be included in its entirety in the initial charge to the polymerization vessel, or else introduced continuously or in stages at the rate at which it is consumed in the course of the free-radical aqueous emulsion polymerization. In each case this will depend, in a manner known to one of ordinary skill in the art, both on the chemical nature of the initiator system and on the polymerization temperature. It is preferred to include a portion in the initial charge and to supply the remainder to the polymerization zone at the rate at which it is consumed.

As well as the seed-free preparation of the polymer dispersion PD it is possible, according to a further embodiment, to prepare polymer dispersions PD having a defined particle size by means of an emulsion polymerization by the seed latex process, or in the presence of a seed latex prepared in situ. Polymerization processes of this kind are known and described, for example, in EP-B 40419, EP-A-614 922, EP-A-567 812, and the literature cited therein, and also in "Encyclopedia of Polymer Science and Technology", vol. 5, John Wiley & Sons Inc., New York 1966, p. 847. The polymerization is preferably carried out in the presence of 0.01% to 3%, preferably 0.02% to 1.5% by weight of a seed latex (the solids content of the seed latex, based on the amount of overall monomer). The seed latex is preferably added at the beginning. Furthermore, the seed latex may also be prepared in situ from a small amount of the monomers intended for the polymerization, in aqueous emulsion, together with a surface-active substance, by the heating of this emulsion to the polymerization temperature and the addition of a portion of the initiator.

The dispersions formed in the polymerization may be subject, following the polymerization procedure, to a physical or chemical aftertreatment. Examples of such processes are the known processes for residual monomer reduction, such as aftertreatment by addition of polymerization initiators or mixtures of two or more polymerization initiators at suitable temperatures, aftertreatment of the polymer solution by means of steam or ammonia vapor, or stripping with inert gas, or treatment of the reaction mixture with oxidizing or reducing reagents, adsorption processes such as the adsorption of impurities on selected media such as activated carbon, for example, or an ultrafiltration.

The polymer P which is obtainable by emulsion polymerization of at least one ethylenically unsaturated monomer M preferably has a glass transition temperature $T_g$ of less than 50° C., more preferably less than 40° C., in particular less than 35° C.

The aqueous polymer dispersion PD typically has a solids content of 20% to 65% by weight, preferably 35% to 60% by weight.

The Binder Composition

An aqueous binder composition for the purposes of this specification means that the continuous phase of this composition is composed to an extent of more than 90% by weight, preferably 95% by weight, and in particular exclusively, of water. Additionally it is possible for water-miscible liquids such as water-soluble monoalcohols, isooctanol for example, diol such as diglyme, and polyols to be part of the continuous phase.

The binder composition preferably comprises less than 15% by weight, in particular less than 10% by weight, based on the overall binder (solids), of polymers other than the abovementioned polymers.

The addition of the oligomer for preparing the binder composition takes place preferably to the polymer dispersion PD, in other words after the emulsion polymerization. Addition to the polymer dispersion PD in this context also comprises addition as part of the formulation of a coating material comprising a polymer P.

The binder composition of the invention typically has a solids content of 20% to 65% by weight, preferably 35% to 60% by weight.

The aqueous binder composition obtained can be used as such or as a mixture with further polymers, generally film-forming polymers in aqueous coating materials, such as paint or varnish mixtures. Hence, in formulations for coating materials, especially in formulations of gloss paints and high-gloss paints based on acrylate dispersions, it leads to an increase in the gloss.

Coating Materials

The invention further provides a coating material in the form of an aqueous composition comprising:
10% to 60% by weight of at least one polymer P (solids) having a glass transition temperature $T_g$ in the range from −20 to +60° C., which is obtainable by free-radical emulsion polymerization of at least one ethylenically unsaturated monomer M, and
0.1 to 10% by weight, based on the sum of polymer P and oligomer, of one or more oligomers which are composed of ethylenically unsaturated monomers and have an average molecular weight $M_w$, of 1000 to 30 000 g/mol, a glass transition temperature $T_g$ in the range from +60 to +120° C., and an acid number in the range from 50 to 350,
up to 70% by weight, preferably 10% to 70% by weight, of inorganic fillers and/or inorganic pigments,
0.1% to 20% by weight of typical auxiliaries, and
water to 100% by weight.

An aqueous coating material for the purposes of this specification means that the continuous phase of the coating material is composed to an extent of more than 80% by weight, preferably 90% by weight, and in particular exclusively, of water. Additionally it is possible for water-miscible liquids such as water-soluble monoalcohols, isooctanol for example, diol such as diglyme and polyols to be part of the continuous phase.

As well as the polymer dispersion PD the binder composition of the coating material may include at least one further film-forming polymer. Examples of such include alkyd resins. Suitable alkyd resins are, for example, water-soluble alkyd resins which preferably have a weight-average molecular weight of 5000 to 40 000. Also suitable are alkyd resins having a weight-average molecular weight of more than 40 000, especially of more than 100 000. An alkyd resin is a polyester which has been esterified with a drying oil, a fatty acid or the like (U. Poth, Polyester and Alkydharze, Vincentz Network 2005). Suitable water-soluble alkyd resins are alkyd resins having a sufficiently high acid number, preferably in the range of 30-65 mg KOH/g. These resins may if appropriate be in partly or fully neutralized form. The weight-average molecular weight is preferably 8000 to 35 000 and more preferably 10 000 to 35 000.

The use of such further film-forming polymers, especially alkyd resins, which raise the VOC content of the coating materials is not preferred. Preference is therefore given to a coating material which comprises at least one polymer dispersion PD and at least one oligomer, but does not comprise any film-forming polymer other than the emulsion polymer present in the polymer dispersion.

The binder compositions of the invention are employed preferably in aqueous coating materials. These coating materials take the form, for example, of an unpigmented system (clear varnish) or of a pigmented system (emulsion paint or emulsion varnish paint). The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: PVC=($V_P$+$V_F$)×100/($V_P$+$V_F$+$V_B$). Coating materials can be divided on the basis of the PVC, for example, as follows:

| | |
|---|---|
| highly filled interior paint, wash resistant, white/matt | about 85 |
| interior paint, scrub resistant, white/matt | 65-80 |
| semigloss paint, silk-matt | about 35 |
| semigloss paint, silk-gloss | about 25 |
| high-gloss paint | 12-30 |
| exterior masonry paint, white | 30-65 |
| clear varnish | 0 |

Elucidated in the text below is the composition of a typical emulsion paint. Emulsion paints comprise generally 30% to 75% and preferably 40% to 65% by weight of nonvolatile constituents. By these are meant all constituents of the preparation which are not water, but at least the total weight of binder, filler, pigment, low-volatility solvents (boiling point above 220° C.), plasticizers for example, and polymeric auxiliaries. This figure is accounted for to the extent of about
a) 3% to 90%, more particularly 10% to 60%, by weight, by the polymer P,
b) 5% to 85%, preferably 5% to 60%, more particularly 10% to 50%, by weight, by at least one inorganic pigment,
c) 0% to 85%, more particularly 5% to 60%, by weight, by inorganic fillers, and
d) 0.1% to 40%, more particularly 0.5% to 20%, by weight, by typical auxiliaries.

With particular preference the binder compositions of the invention are suitable as a component in clear varnishes and in high-gloss emulsion paints having a PVC in the range of 12-30, preferably 15-30.

Particular preference is given to coating materials in the form of an aqueous composition comprising 20% to 50% by weight of the polymer P (solids), 0.1% to 10% by weight, based on the sum of polymer P and oligomer, of one or more oligomers composed of ethylenically unsaturated monomers, 10% to 30% by weight of inorganic fillers and/or inorganic pigments, 0.1% to 20% by weight of typical auxiliaries, and water to 100% by weight.

The invention further provides a method of producing coatings featuring increased gloss, which comprises applying to a substrate an aqueous coating material of the invention.

The term "pigment" is used in the context of this invention comprehensively to identify all pigments and fillers, examples being color pigments, white pigments, and inorganic fillers. These include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers, or comprise no fillers.

Finely divided fillers may also be used to increase the hiding power and/or to save on the use of white pigments. In order to adjust the hiding power, the hue, and the depth of color, it is preferred to use blends of color pigments and fillers.

The fraction of the pigments can be described, as described above, by the pigment volume concentration (PVC). Coating materials of the invention in the form of high-gloss paints, for example, have a PVC in the range from 12% to 35%, preferably 15% to 30%.

The coating material of the invention (aqueous coating material) may comprise—in addition to the polymer dispersion PD, the oligomer, pigment and, if appropriate, additional film-forming polymers—further auxiliaries.

The typical auxiliaries, in addition to the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Suitable thickeners are, for example, associative thickeners, such as polyurethane thickeners. The amount of the thickener is preferably less than 1% by weight, more preferably less than 0.6% by weight, of thickener, based on solids content of the coating material.

Additionally suitable auxiliaries are film-forming auxiliaries or coalescence auxiliaries. Preference is given to using, for example, white spirit, ethylene glycol, propylene glycol, glycerol, ethanol, methanol, water-miscible glycol ethers and their acetates such as diethylene glycol, 1-methoxy-2-propanol, 2-amino-2-methyl-1-propanol, isooctanol, butyl glycol, butyl diglycol, diethylene glycol monobutyl ether, dipropylene glycol monomethyl ether or dipropylene glycol monobutyl ether, dipropylene glycol methyl ether, dipropylene glycol propyl ether, dipropylene glycol n-butyl ether, tripropylene glycol n-butyl ether, propylene glycol phenyl ether, butyl glycol acetate, butyl diglycol acetate, 2,2,4-trimethyl-1,3-pentanediol monoisobutyrate, diisobutyl esters of long-chain dicarboxylic acids such as Lusolvan® FBH or tripropylene glycol monoisobutyrate.

The coating materials of the invention are produced in a known way by blending the components in mixing apparatus customary for the purpose. It has been found appropriate to prepare an aqueous paste or dispersion from the pigments, water, and, if appropriate, the auxiliaries, and only then to mix the polymeric binder, i.e., in general, the aqueous dispersion of the polymer, with the pigment paste or pigment dispersion.

The coating materials of the invention comprise generally 30% to 75% and preferably 40% to 65% by weight of non-volatile constituents. By these are meant all constituents of the preparation which are not water, but at least the total amount of binder, pigment, and auxiliary, based on the solids content of the coating material. The volatile constituents are primarily water.

Suitable coating materials are highly glossy coating materials. The gloss of the coating material can be determined by DIN EN ISO 2813. In this case the coating material is applied with slot width of 240 μm to a glass plate and is dried at room temperature for 72 hours. The test specimen is inserted into a calibrated reflectometer, and a determination is made, with a defined angle of incidence, of the extent to which the light returned has been reflected or scattered. The reflectometer value determined is a measure of the gloss (the higher the value, the higher the gloss).

The gloss of high-gloss paints is preferably greater than 60 at 20° and greater than 80 at 60°. The reflectometer value is determined at 23° C. and is reported as a dimensionless parameter as a function of the incident angle, e.g., 40 at 20°.

The coating material of the invention may be applied to substrates in a typical way, as for example by spreading, spraying, dipping, rolling, knife coating, etc.

It is used preferably as an architectural coating material, i.e., for coating buildings or parts of buildings. The substrates in question may be mineral substrates such as renders, plaster or plasterboard, masonry or concrete, wood, woodbase materials, metal or paper, wallpaper for example, or plastic, PVC for example.

The coating material is used preferably for internal parts of buildings, such as interior walls, internal doors, paneling, banisters, furniture, etc.

The coating materials of the invention feature ease of handling, good processing properties, and high hiding power. Their pollutant content is low. They have good performance properties, such as high water resistance, good wet adhesion, not least on alkyd paints, high blocking resistance, good overcoatability, and good flow on application. The equipment used is easily cleaned with water.

The invention is elucidated in more detail with reference to the following, nonlimiting examples.

EXAMPLES

Preparation of a Polymer Dispersion PD

Example A

A polymerization vessel equipped with metering apparatus and temperature regulation was charged with the following:
Initial Charge:

| | |
|---|---|
| 528.0 g | water |
| 46.7 g | a polystyrene seed dispersion having a solids content of 33% by weight and an average particle size of 30 nm |
| 3.67 g | a 15% strength by weight aqueous solution of sodium lauryl sulfate |

This initial charge was then heated to 85° C. with stirring. Subsequently, with this temperature maintained, 5% by weight of feed 2 was added, followed by stirring for 5 minutes. Then feed 1 was metered in over a period of 180 minutes. Cocurrently the remainder of feed 2 was metered in over a period of 195 minutes.
Feed 1

| | |
|---|---|
| 543.2 g | water |
| 125.4 g | a 15% strength by weight aqueous solution of sodium lauryl sulfate |
| 458.0 g | n-butyl acrylate |
| 399.6 g | methyl methacrylate |
| 165.1 g | styrene |
| 22.78 g | methacrylic acid |
| 21.45 g | ureidomethacrylate (N-(2-methacryloyloxyethyl)imidazolidin-2-one) |
| 33.0 g | Bisomer MPEG 350 MA (methoxypolyethylene glycol monomethacrylate from Laporte Performance Chemicals UK) |

Feed 2:

| | |
|---|---|
| 83.6 g | water |
| 4.4 g | sodium peroxodisulfate |

After the end of feed 1, 22 g of water were added. After the end of feed 2, polymerization was continued for 30 minutes and the product was neutralized with 7.47 g of 25% strength aqueous ammonia solution. Thereafter 13.2 g of 5% strength by weight aqueous hydrogen peroxide solution were added, and a solution of 0.557 g of ascorbic acid in 4.96 g of water was metered in over 60 minutes. Thereafter the dispersion was left to cool and was filtered through a 125 μm filter. This gave 2.48 kg of aqueous polymer dispersion whose solids content was 46%. The polymer was found by DSC to have a glass transition temperature of 32° C.
Inventive Binder Composition Examples 1a The polymer dispersion obtained in accordance with example A was subsequently admixed with 1% by weight, based on the polymer (solids), of a 31% strength by weight aqueous ammoniacal solution of an oligomer with a monomer composition of 23.5 parts by weight styrene, 33.5 parts by weight α-methylstyrene, 5.5 parts by weight 2-ethylhexyl acrylate and 31.9 parts by weight acrylic acid. The oligomer was prepared by analogy with example 1 of U.S. Pat. No. 4,414,370. It has a glass transition temperature of 117° C., an acid number of 224 KOH/g and an $M_w$ of 9200 g/mol.

The amount in which the water-soluble oligomer was added was 1% by weight, based on the sum of polymer P (binder polymer solids) and oligomer.

Example 2a, b, c

The polymer dispersion from example A was admixed with 1% by weight (example 2a), 2.5% by weight (example 2b) and 5% by weight (example 2c) of a polystyrene dispersion having an HDC particle size of 50 nm, comprising an oligomer (solids based on solids of the polymer dispersion from example A). The polystyrene dispersion was prepared by polymerizing styrene in the presence of the oligomer described in example 1a.

The amounts in which the water-soluble oligomer was added were 0.6%, 1.5% and 3%, by weight, based on the sum of polymer P (binder polymer solids) and oligomer.

Example 3a, b

The polymer dispersion was admixed with 1% and 2.5% by weight in each case, based on the binder composition (solids), of Joncryl 8064.

Example 4a-c

The polymer dispersion was admixed with 1%, 2.5%, and 5%, by weight, based in each case on the binder composition (solids), of Joncryl 77.

III. Performance Examples

1. General Instructions for Preparing Coating Material

The individual components (for manufacturers see table 1) were metered in in the amount (parts by weight) and sequence as shown in table 2 with stirring using a toothed-disk stirrer. Following addition of the titanium dioxide pigment, the speed was increased to 2000 rpm and dispersion took place until the paste was smooth, i.e., free from lumps. This gave 66 parts by weight of a paste.

If necessary, this paste was cooled to room temperature and the remaining components, which are listed in table 3, were added in the amounts and sequence indicated in the table, at a reduced speed. This gave 200 parts by weight of an aqueous coating material.

Starting from the polymer dispersion PD, the coating material B0 was obtained. Starting from the binder compositions of examples 1a, 2a-c, 3a-c and 4a-c, comprising the oligomer of the invention, the pigment-comprising coating materials B1a-c, B2a-c, B3a-c and B4a-c were obtained.

TABLE 1

| Function | Name | Manufacturer |
|---|---|---|
| Dispersant | Disperbyk ® 190 (high molecular mass block copolymer with pigment-active groups) | Byk-Chemie GmbH, Wesel |

TABLE 1-continued

| Function | Name | Manufacturer |
|---|---|---|
| Defoamer | Byk ® 020 (polysiloxane) | Byk-Chemie GmbH, Wesel |
| | Tego Airex ® 902W (silica-containing poly(ethersiloxane) copolymer | Tego Chemie, Essen |
| Titanium dioxide pigment | Kronos ® 2190 | Kronos Titan GmbH, Leverkusen |
| Thickener | DSX 2000 and DSX 1514 (polyurethane-based associative thickeners) | Cognis Deutschland GmbH & Co. KG, Düsseldorf |

TABLE 2

Formulation of the paste

| Component | Name | Amount [g] |
|---|---|---|
| Water | | 10.72 |
| Defoamer | Byk ® 020 | 0.96 |
| Dispersant | Disperbyk ® 190 | 4.7 |
| Thickener | DSX 2000/1514 (1:0.3) | 2.46 |
| Titanium dioxide pigment | Kronos ® 2190 | 47.16 |
| Total (Paste) | | 66 |

TABLE 3

Components of the coating material

| Component | | Amount |
|---|---|---|
| Aqueous paste | | 66 |
| Water | | 7.7 − x [1] |
| Solvent | Propylene glycol | 4.36 |
| Defoamer | Tego Airex ® 902W | 0.04 |
| Aqueous binder composition | | 121.9 + x [1] |
| Total | | 200.0 |

[1] The value 121.9, i.e. x = 0, applies for the comparative example B0, i.e., for the pure polymer dispersion PD with solids content 46% without added oligomer. The compositions comprising the oligomers in some cases had a lower and in some cases a higher solids content, and so, by admixing to the polymer dispersion PD, a composition whose solids content was lower than or higher than that of the original dispersion PD was obtained. In order to use the same amount of binder (solids) in each case for paint formulation, accordingly, a greater or lesser amount of the blended composition was employed. The additional or reduced amount of water occasioned by this measure was corrected by subtracting or adding, respectively, the amount of water added at the paint formulation stage (7.7 in the case of the formulation with the pure polymer dispersion PD).

2. Testing of the Aqueous, Pigment-Comprising Coating Materials B1a, B2a-c, B3a,b and B4a-c The gloss of the coating material is determined in accordance with DIN EN ISO 2813: the coating material is applied with a slot width of 240 μm to a glass plate and dried at room temperature for 72 hours. The test specimen is inserted into a calibrated haze-gloss reflectometer (from Byk-Gardner, Geretsried) and the reflectometer value at 20° and 60° incident angles, and also the haze, are read off. The reflectometer value determined is a measure of the gloss (the higher the value, the higher the gloss). The haze is a measure of the diffuse reflection (the lower the value, the higher the gloss).

TABLE 4

| Coating material | Binder composition | Water x [g] | *[% by weight] | Gloss (60°) | Gloss (20°) | Haze |
|---|---|---|---|---|---|---|
| B0 | PD | — | — | 77.5 | 52.2 | 187 |
| B1a | 1a | — | 1 | 88.8 | 71.5 | 59.3 |
| B2a | 2a | −1.1 | 0.6 | 78.8 | 60.7 | 129 |
| B2b | 2b | −2.5 | 1.5 | 84 | 66.9 | 105 |
| B2c | 2c | 2.0 | 3 | 89.4 | 78.2 | 25.5 |
| B3a | 3a | −0.4 | 0.2 | 86.3 | 60.8 | 79.5 |
| B3b | 3b | 0.1 | 0.6 | 88.6 | 69.2 | 58.5 |
| B4a | 4a | 0.8 | 0.1 | 83.6 | 55.7 | 87.8 |
| B4b | 4b | 1.5 | 0.2 | 88.4 | 72.3 | 33.3 |
| B4c | 4c | 1.2 | 0.6 | 89.2 | 74.6 | 29.8 |

*% by weight of oligomer based on the sum of polymer P (solids) and oligomer.

The invention claimed is:

1. An aqueous binder composition, comprising:
   a polymer P having a glass transition temperature $T_g$ in a range from −20 to +60° C., in the form of an aqueous polymer dispersion PD which is obtained by free-radical emulsion polymerization of at least one ethylenically unsaturated monomer M, and
   an oligomer comprising, in polymerized form, an ethylenically unsaturated monomer and having an average molecular weight $M_w$ of 1000 to 30 000 g/mol, a glass transition temperature $T_g$ in a range from +60 to +120° C., and an acid number in a range from 224 to 350,
   wherein the oligomer is present in an amount 0.1 to 3% by weight, based on a sum of the polymer P and the oligomer.

2. The composition of claim 1, wherein the oligomer is obtained by free-radical polymerization of a monoethylenically unsaturated monomer having a water solubility <30 g/l at 25° C. and 1 bar and an ethylenically unsaturated carboxylic acid, and, optionally, up to 10% by weight, based on overall monomers in copolymerized form, of other monomers.

3. The composition of claim 1, wherein the oligomer is obtained by bulk polymerization.

4. The composition of claim 1, wherein the oligomer is obtained by bulk polymerization of
   (i) a water-soluble monomer selected from the group consisting of acrylic acid, methacrylic acid, fumaric acid, maleic anhydride, and itaconic acid, and
   (ii) a monomer selected from the group consisting of an alkyl ester of acrylic acid, an alkyl ester of methacrylic acid, an acrylamide and a derivative thereof, styrene, α-methylstyrene, methyl methacrylate, butyl acrylate, and 2-ethylhexyl acrylate.

5. The composition of claim 1, wherein the oligomer is prepared by bulk polymerization in a temperature range from 180 to 270° C.

6. The composition of claim 1, wherein the oligomer has a polydispersity $M_w/M_n$<5.

7. The composition of claim 1, further comprising:
   0.01% to 15% by weight of polystyrene, based on overall binder (solids).

8. The composition of claim 1, wherein the emulsion polymerization is carried out with at least 80% by weight, based on an overall weight of the monomers M, of a monoethylenically unsaturated monomer M1, a principal monomer, having a water solubility <30 g/l.

9. The composition of claim 8, wherein the emulsion polymerization is carried out with, in addition to principal monomer M1, up to 20% by weight, based on an overall weight of the monomers M, of at least one monomer M2 having a water solubility ≥30 g/l.

10. The composition of claim 8, wherein the emulsion polymerization is carried out with additionally 0.5% to 15% by weight, based on the overall weight of the monomers M, of a polyether (meth)acrylate.

11. The composition of claim 8, wherein the emulsion polymerization is carried out with additionally 0.5% to 15% by weight, based on the overall weight of the monomers M, of a monomer containing at least one urea group.

12. A coating material in the form of an aqueous composition, comprising:
- 10% to 60% by weight of a polymer P having a glass transition temperature $T_g$ in a range from −20 to +60° C., which is obtained by free-radical emulsion polymerization of an ethylenically unsaturated monomer M, and
- 0.1 to 3% by weight, based on a sum of polymer P and an oligomer comprising an ethylenically unsaturated monomer and having an average molecular weight $M_w$ of 1000 to 30 000 g/mol, a glass transition temperature $T_g$ in a range from +60 to +120° C., and an acid number in a range from 224 to 350,
- up to 70% by weight of at least one selected from the group consisting of an inorganic filler and an inorganic pigment,
- 0.1% to 20% by weight of at least one typical auxiliary, and
- water to 100% by weight.

13. The coating material of claim 12, in the form of a high-gloss paint having a pigment volume concentration (PVC) in a range from 12 to 30.

14. A method of producing a coating with increased gloss, comprising applying the aqueous coating material of claim 12 to a substrate.

15. A method of increasing the gloss of a coating, the method comprising combining the oligomer having an average molecular weight $M_w$ of 1000 to 30 000 g/mol, a glass transition temperature $T_g$ in a range from +60 to +120° C., and an acid number in a range from 224 to 350, with the polymer P, to obtain the aqueous binder composition of claim 1, in a mixture.

16. The composition of claim 4, wherein the water-soluble monomer is selected from the group consisting of acrylic acid and methacrylic acid.

17. The composition of claim 7, comprising:
- 0.02% to 10% by weight of polystyrene, based on overall binder (solids).

18. The composition of claim 1, wherein the emulsion polymerization is carried out with at least 85% by weight, based on an overall weight of the monomers M, of a monoethylenically unsaturated monomer M1, a principal monomer, having a water solubility <30 g/l.

19. The composition of claim 1, wherein the emulsion polymerization is carried out with at least 90% by weight, based on an overall weight of the monomers M, of a monoethylenically unsaturated monomer M1, a principal monomer, having a water solubility <30 g/l.

20. The coating material of claim 12, in the form of a high-gloss paint having a pigment volume concentration (PVC) in a range from 15 to 30.

* * * * *